US012465860B2

(12) United States Patent
Rodriguez

(10) Patent No.: US 12,465,860 B2
(45) Date of Patent: Nov. 11, 2025

(54) METHOD AND APPARATUS PROVIDING A COMPUTER IMPLEMENTED GAME

(71) Applicant: KING.COM LIMITED, St. Julians (MT)

(72) Inventor: Victor Rodriguez, Stockholm (SE)

(73) Assignee: Microsoft Technology Licensing, LLC, Redmond, WA (US)

( * ) Notice: Subject to any disclaimer, the term of this patent is extended or adjusted under 35 U.S.C. 154(b) by 5 days.

(21) Appl. No.: 18/469,172

(22) Filed: Sep. 18, 2023

(65) Prior Publication Data

US 2024/0001245 A1 Jan. 4, 2024

Related U.S. Application Data

(63) Continuation of application No. 17/456,945, filed on Nov. 30, 2021, now Pat. No. 11,759,713.

(51) Int. Cl.

| | |
|---|---|
| ***A63F 13/69*** | (2014.01) |
| ***A63F 13/52*** | (2014.01) |
| ***A63F 13/53*** | (2014.01) |
| ***G06F 18/22*** | (2023.01) |

(52) U.S. Cl.

CPC .............. *A63F 13/69* (2014.09); *A63F 13/52* (2014.09); *A63F 13/53* (2014.09); *G06F 18/22* (2023.01)

(58) Field of Classification Search

None

See application file for complete search history.

(56) References Cited

U.S. PATENT DOCUMENTS 10,561,931 B2 2/2020 Darabian
2014/0370950 A1* 12/2014 Hansson ................ A63F 13/00 463/9

OTHER PUBLICATIONS

"Candy Crush Soda Saga Frosting Levels", YouTube Video, Pete Peppers, https://www.youtube.com/watch?v=1K4FW-Gr1_o, Nov. 4, 2014 (Year: 2014).*
"Candy Crush Soda Saga" google search results page.
Candy Crush Cheats, (URL: https://web.archive.org/web/20160430063505/https://candycrush-cheats.com/soda-level-285/).
YouTube video "Candy Crush Soda Saga Level 285 No Boosters" (URL: https://www.youtube.com/watch?v=XtKlq0nEwak).

* cited by examiner

*Primary Examiner* — Damon J Pierce
(74) *Attorney, Agent, or Firm* — Holzer Patel Drennan

(57) ABSTRACT

A computer device provides a computer implemented game. A display displays game elements in a game board which has tiles. A first type of game element occupy two or more tiles and a second type of game element occupy one tile. The first type of game element has layers with each layer associated with a matching characteristic. A user interface detects user input when a user engages with a game element in a move. At least one processor determines that second game elements having at least one common matching characteristic satisfy a match condition and at least one of those second game elements is adjacent to a first game element. In response, it is determined if that first game element has a layer associated with the common matching characteristic, and if so, causes the layer associated with the common matching characteristic to be removed.

16 Claims, 10 Drawing Sheets

METHOD AND APPARATUS PROVIDING A COMPUTER IMPLEMENTED GAME

CROSS-REFERENCE TO RELATED APPLICATIONS

This application is a continuation of U.S. application Ser. No. 17/456,945, filed on Nov. 30, 2021, the entire contents of which being fully incorporated herein by reference.

FIELD OF THE INVENTION

Embodiments of this application relate to a user device configured to provide a computer implemented game.

Some embodiments may relate to engaging users or players in a computer game executable in an online or offline environment.

BACKGROUND OF THE INVENTION

In the field of computer-implemented games, there are many technical challenges facing the designer of such computer implemented games when considering how, for example, the user interface is to be controlled in the context of computer devices available to play the game.

One technical challenge can involve allowing a game to be fun and compelling even when there is limited display resource available, such as when a computer implemented game is being played on a smartphone, tablet or other minicomputer. Another significant challenge is that of user engagement. Engagement involves designing gameplay to be engaging and rewarding to players. This typically requires games to be easily understood at their simplest or introductory levels, providing rewarding gameplay with quite simple game mechanics, but becoming progressively more challenging so that players are not bored, but remain engaged and develop rewarding skills. Effective engagement requires various forms of feedback to reinforce player sense of success and accomplishment.

A common genre of casual games is so-called match games. This is a type of tile-matching game where the player manipulates tiles or game objects according to a matching criterion.

A match-three game is a type of casual puzzle game where the player is required to find patterns on a seemingly chaotic board. The player then has to match three or more of the same type of game element on the game board and those matched elements will then disappear. An existing type of match-three game is a so-called "switcher" game. In a switcher game, the player switches place of two adjacent game elements on the game board so that one or both of them create a chain of at least three adjacent game elements of the same type. Those matched game elements will then disappear. The game board is then repopulated with game objects.

One such known match three-type game is Candy Crush Saga. In that game, the game board is repopulated with game elements which are perceived as falling downwards onto the game board from the top edge of the screen from which the game is played.

Another known type of game is "linker game", where a sequence of game elements are linked to form a known sequence. Another type of game is a 'clicker' game, in which matches can be made in a board by clicking a group of adjacent game elements.

A technical challenge exists when introducing complexity into such match games. A technical challenge may arise for example when there is limited display resource available and/or in the providing of effective user engagement, such as described previously.

This patent specification describes not only various ideas and functions, but also their creative expression. A portion of the disclosure of this patent document therefore contains material to which a claim for copyright is made and notice is hereby given: Copyright King.com Limited 2021 (pursuant to 17 U.S.C. 401). A claim to copyright protection is made to all screen shots, icons, look and feel and all other protectable expression associated with the games illustrated and described in this patent specification.

The copyright owner has no objection to the facsimile reproduction by anyone of the patent document or the patent disclosure, as it appears in the Patent and Trademark Office patent file or records, but reserves all other copyright rights whatsoever. No express or implied license under any copyright whatsoever is therefore granted.

SUMMARY OF THE INVENTION

According to one embodiment, there is provided a computer device configured to provide a computer implemented game, the computer device comprising: a display configured to display game elements in a game board of a computer implemented game, the game board comprising a plurality of tiles, the game elements comprising a first type of game element which each occupy two or more tiles of the game board and a second type of game element which each occupy one tile of the game board, the first game element having a plurality of layers, each layer being associated with a matching characteristic; a user interface configured to detect user input when a user engages with a game element in a move; and at least one processor configured to determine that second game elements having at least one common matching characteristic satisfy a match condition and at least one of the second game elements satisfying the match condition is adjacent to a first game element, in response to determine if that first game element has a layer associated with the common matching characteristic, and if so, to cause the layer associated with the common matching characteristic to be removed from the first game element.

Each of the layers of the first game element may be associated with different matching characteristics.

At least two of the layers of the first game element may be associated with a same matching characteristics.

When all of the layers of the first game element are removed, two game objects may be provided on the two tiles occupied by the first game element.

The two game objects may underly the layers of the first game element.

As one or more layers of a respective first game element are removed, at least a part of one or both of the two game objects may be displayed on the display.

One or more of the two game objects may comprise a booster game object.

The at least one processor may be configured to determine that a last one of the layers of a first game object has been removed and to ensure that one or more of the two game objects which comprise the booster are available for the user to select in a next move of the user.

The game elements may further comprise one or more booster game objects and the at least one processor may be configured to determine that one or more booster game objects has been triggered to interact with a first game element and in response to cause a layer of the first game element to be removed.

Interaction with the first game element may comprise providing an effect at one or more of the tiles occupied by that first game element.

Interaction with the first game element may comprise providing an effect on a game element at a location adjacent to the first game element.

Interaction with the first game element may comprise providing an effect on a game element at a location adjacent to the first game element, said game element at the location adjacent to the first game element having a matching characteristic which is the same as that of the layer which is removed.

The matching characteristic may comprise at least one of a colour characteristic; a shape characteristic and an object characteristic.

According to another embodiment, there is provided a computer implemented method provided by a computer device configured to provide a computer implemented game, the method comprising: displaying, by a display of the computer device, game elements in a game board of a computer implemented game, the game board comprising a plurality of tiles, the game elements comprising a first type of game element which each occupy two or more tiles of the game board and a second type of game element which each occupy one tile of the game board, the first game element having a plurality of layers, each layer being associated with a matching characteristic; detecting, by a user interface of the computer device, user input when a user engages with a game element in a move; determining, by at least one processor of the computer device, that second game elements having at least one common matching characteristic satisfy a match condition and at least one of the second game elements satisfying the match condition is adjacent to a first game element; and in response, determining by at least one processor if that first game element has a layer associated with the common matching characteristic, and if so, causing the layer associated with the common matching characteristic to be removed from the first game element.

Each of the layers of the first game element may be associated with different matching characteristics.

At least two of the layers of the first game element may be associated with a same matching characteristics.

When all of the layers of the first game element are removed, two game objects may be provided on the two tiles occupied by the first game element.

The two game objects may underly the layers of the first game element.

As one or more layers of a respective first game element are removed, at least a part of one or both of the two game objects may be displayed on the display.

One or more of the two game objects may comprise a booster game object.

The method may comprise determining, by the at least one processor, that a last one of the layers of a first game object has been removed and ensuring that one or more of the two game objects which comprise the booster are available for the user to select in a next move of the user.

The game elements may further comprise one or more booster game objects and the method may comprise determining, by the least one processor, that one or more booster game objects has been triggered to interact with a first game element and in response causing a layer of the first game element to be removed.

Interaction with the first game element may comprise providing an effect at one or more of the tiles occupied by that first game element.

Interaction with the first game element may comprise providing an effect on a game element at a location adjacent to the first game element.

Interaction with the first game element may comprise providing an effect on a game element at a location adjacent to the first game element, said game element at the location adjacent to the first game element having a matching characteristic which is the same as that of the layer which is removed.

The matching characteristic may comprise at least one of a colour characteristic; a shape characteristic and an object characteristic.

According to some aspects, there is provided a program product comprising a computer-readable storage device including a computer-readable program for providing a computer-implemented game, wherein the computer-readable program when executed on a computer causes the computer to perform any one or more of the method steps described previously.

A computer program comprising program code means adapted to perform the method(s) may also be provided. The computer program may be stored and/or otherwise embodied by means of a carrier medium.

In the above, many different embodiments have been described. It should be appreciated that further embodiments may be provided by the combination of any two or more of the embodiments described above.

Various other aspects and further embodiments are also described in the following detailed description and in the attached claims.

BRIEF DESCRIPTION OF THE DRAWINGS

Embodiments will now be described by way of the accompanying drawings in which.

DESCRIPTION OF PREFERRED EMBODIMENTS

The terms user and player are used interchangeably throughout this document and no specific meaning is intended using one or the other unless the context suggests otherwise. In the following description of various implementations of the embodiments, reference is made to the accompanying drawings which form a part thereof, and in which is shown by way of illustration various implementations in which the invention may be utilized. It is to be understood that other implementations may be utilized, and structural and functional modifications may be made without departing from the scope of the present invention.

A person skilled in the art will realise that the different approaches to implementing the computer game is not exhaustive, what is described herein are certain preferred embodiments. It is possible to implement the computer game in a number of variations.

Figure 4:
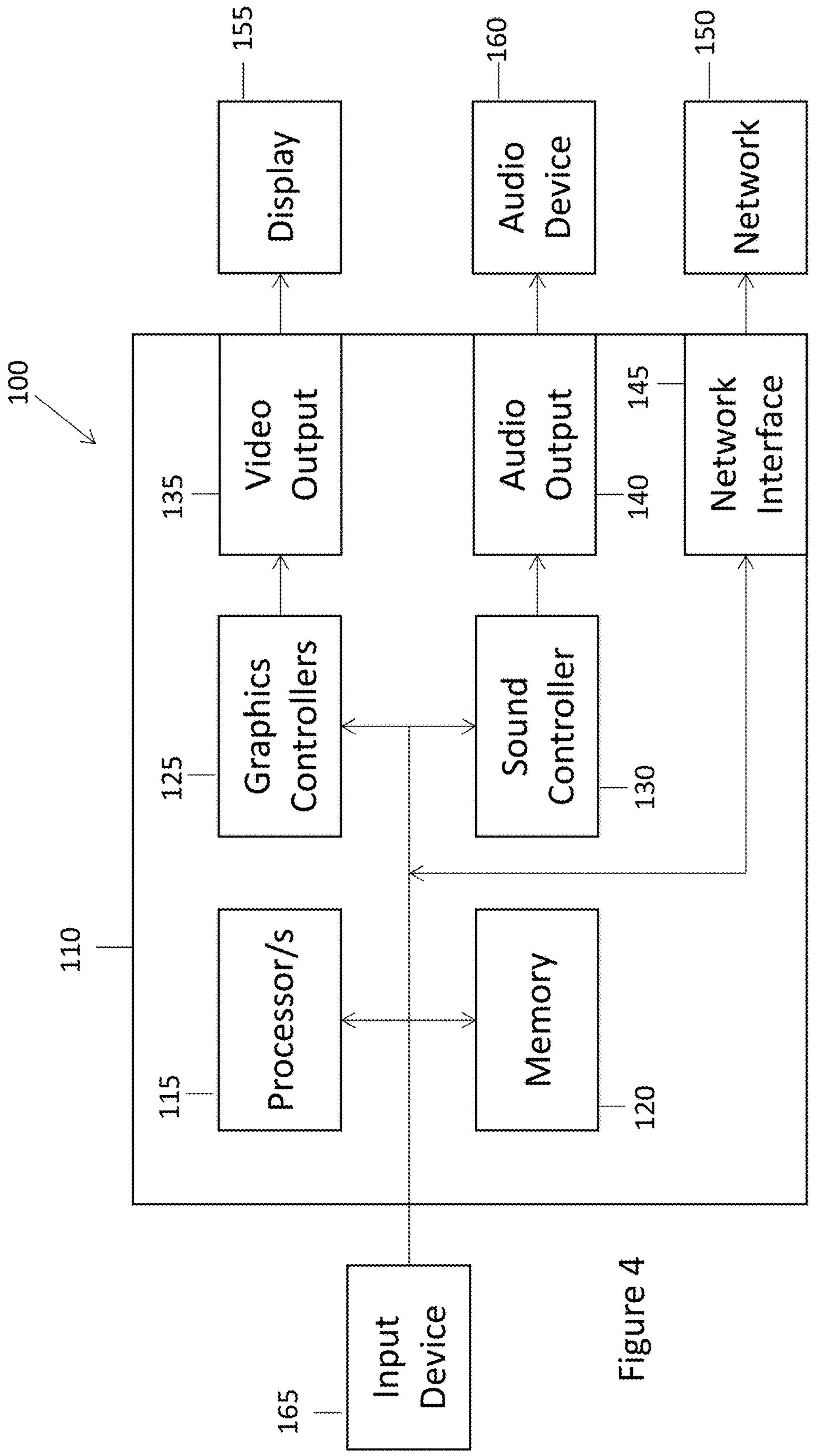
FIG. 4 shows an example user device configured to provide some embodiments.

A schematic view of a user device 100 according to an embodiment is shown in FIG. 4. All of the blocks shown are implemented by suitable circuitry. The blocks may be implemented in hardware and/or software. The user device may have a control part 110. The control part 110 is also shown as having a graphics controller 125 and a sound controller 130. It should be appreciated that one or other or both of the graphics controller 125 and sound controller 130 may be provided by the one or more processors 115.

The graphics controller 125 is configured to provide a video output 135. The sound controller 130 is configured to provide an audio output 140. The control part 110 has an interface 145 allowing the device to be able to communicate with a network 150 such as the Internet or other communication infrastructure.

The video output 135 is provided to a display 155. The audio out 140 is provided to an audio device 160 such as a speaker and or earphone(s).

The device 100 has an input device 165. The input device can take any suitable format and can be one or more of a keyboard, mouse, touch screen, joystick or game controller. It should be appreciated that the display 155 may in some embodiments also provide the input device 165 by way of an integrated touch screen for example.

The blocks of the control part 110 are configured to communicate with each other by an interconnect such as a bus or any other suitable interconnect and/or by point to point communication.

It should be appreciated that in some embodiments, the control part may be implemented by one or more integrated circuits, at least in part.

The user device 100 is shown by way of example only. In alternative embodiments, one or more of the parts may be omitted. Alternatively or additionally, some embodiments may comprise one or more other parts. Alternatively or additionally, one or more parts may be combined.

Figure 3:
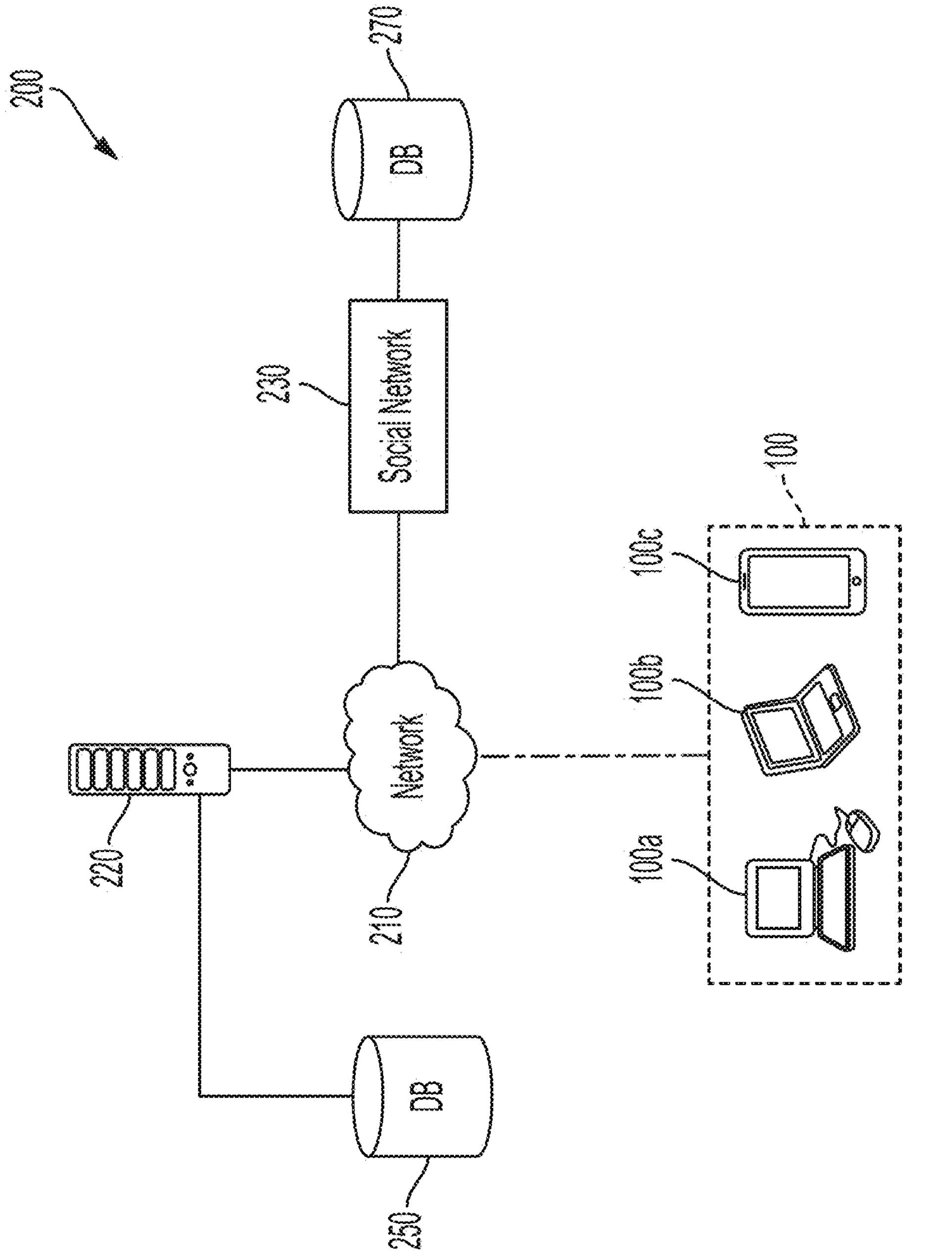
FIG. 3 shows an example system in which some embodiments may be provided.

FIG. 3 schematically shows a system 200 according to an embodiment. The system 200 comprises a server 220 which may store or be in communication with database 250 which may store game player's details, profiles, statistics etc. In practice, one or more databases 250 may be provided. Where more than one server 220 is provided, the database(s) 250 may be provided in one server 220 or across two or more servers. The server 220 may also have a games data function. This may comprise one or more units of memory to store the computer game program and user behaviour data, and a processor to run the games program and process the user behaviour data.

The server 220 may communicate via, for instance, the internet 210 to one or more client or user devices 100, shown in FIG. 3 by way of example as user devices 100*a*, 100*b* and 100*c*. There may be connections, via the network 210, to a social network 230, for example, Facebook™. The social network 230 may also be connected to a database 270 storing social user interaction details, for instance, user to user interaction maps, friend lists, location history etc. In practice, one or more databases 270 may be provided.

It should be appreciated that embodiments may be deployed in different system architectures. For example, the computer game may be implemented as a computer game that is stored in the memory of the user device and is run on the processor of the user device. However, the server 220 may handle some elements of the game in some embodiments. By way of example only, a Java game applet may be provided to the user device 100 and the locally running Java applet will generate, for example, the graphics, sounds, and user interaction for the game play on the user device. Some data may be fed back to the server to allow interaction with other players. The data which is fed back may alternatively or additionally allow scoring and/or cross platform synchronization.

In some embodiments, the game may be implemented as a computer program that is stored in a memory of the system, for example the server, and which runs on a processor of the game server. Data streams or updates are supplied to the user device to allow the user device to render and display graphics and sounds in a browser of the user device. Such an approach is sometimes referred to as a web services approach. It should be appreciated, however, that such an approach does not necessarily require the use of the Internet.

It should be appreciated that some embodiments may be provided as stand-alone games on the user device.

Figure 1:
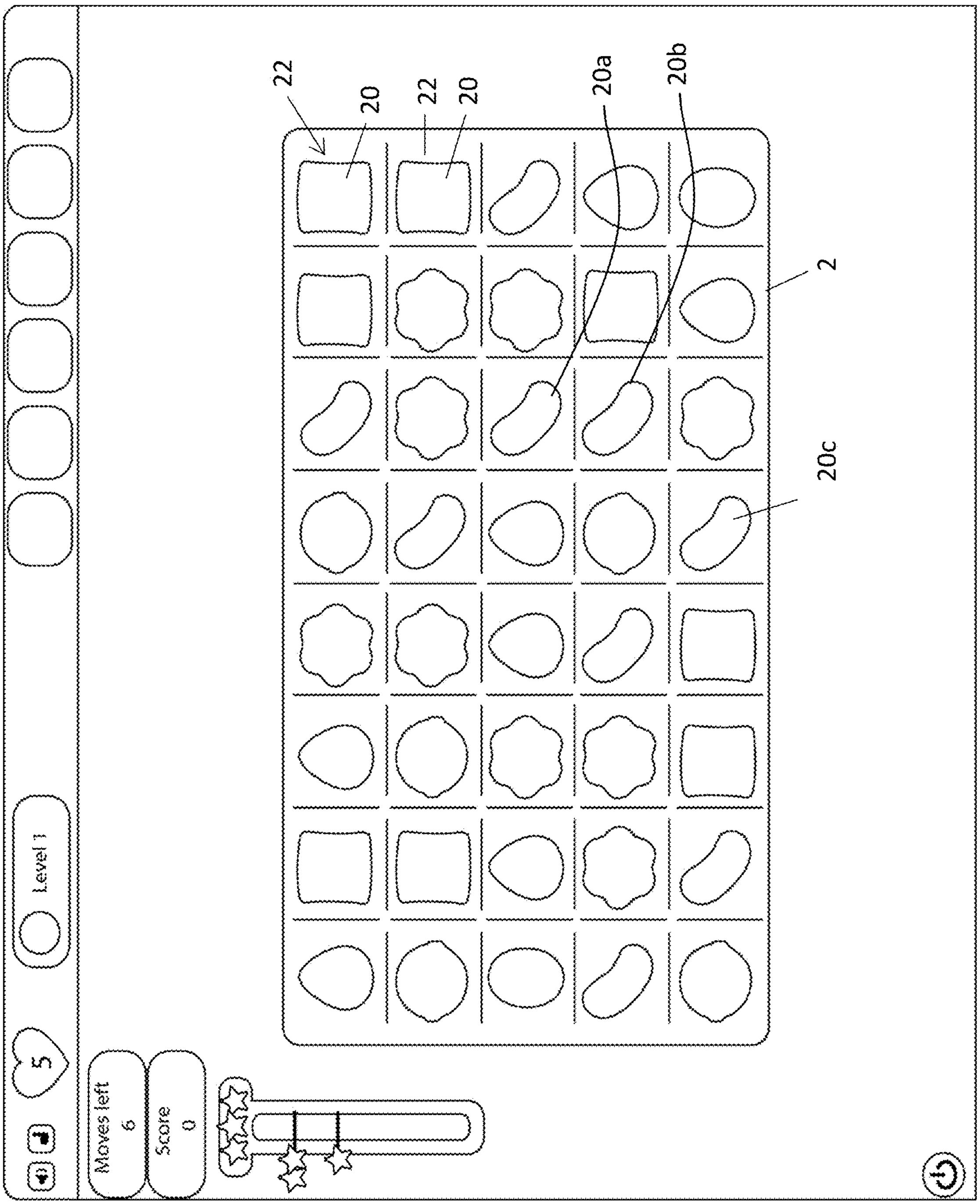
FIG. 1 is a schematic diagram of a game board of a match three game illustrating a basic example of a match three game.

FIG. 1 shows a known version of a match 3 switcher game called Candy Crush Saga™ which is displayed on a display of communication device. FIG. 1 illustrates a game board 2 with a plurality of game elements 20. The game elements are each of six different shapes and colours. Of course in other embodiments, there may be more or less than six different game elements. Each game element type may be defined by one or more of particular characteristics, for example a particular shape and colour combination. Each game element is supported by a tile 22.

Figure 2:
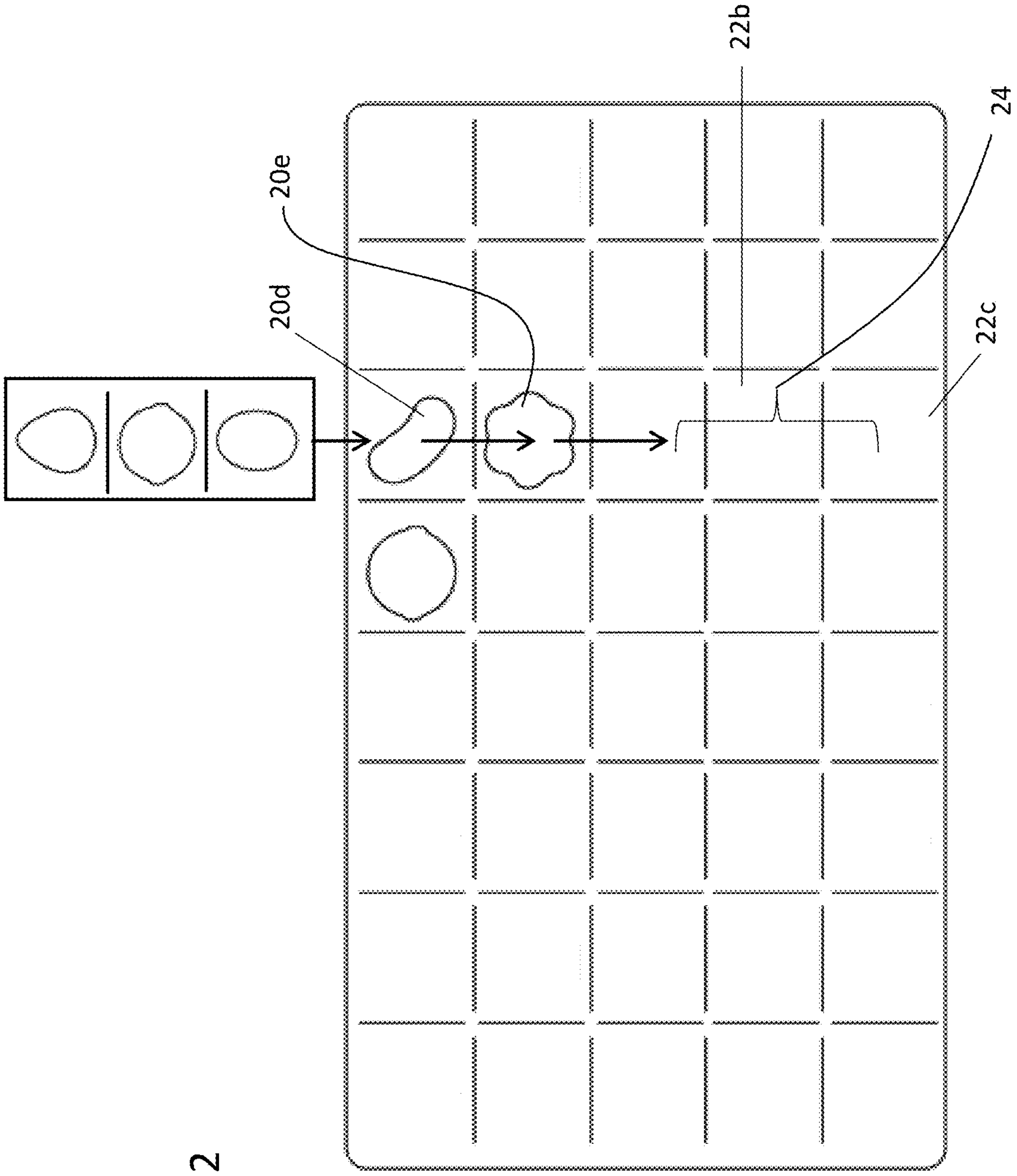
FIG. 2 is a schematic diagram illustrating how a game board is populated with replacement game elements.

In the known version of the match 3 switcher game, the aim of the game is to swap game elements in the shape of candies with each other to make moves on the game board. To gain points the player has to make moves that create matches of at least three of the same game element or candy. In doing so, the player gains points and the matched game elements are removed. As a result new game elements fall into place from the top of the game board in order to fill any spaces created. Assume in FIG. 1 that game element 20*c* is moved one place to the right to form a three-line match with game elements 20*a* and 20*b*. Turning now to FIG. 2, this has the effect of game elements 20*a*, 20*b* and 20*c* being removed or "disappearing" from the game board, creating a visual effect (animation) on the screen to indicate the disappearance, such as a minimal explosion effect. The two game elements which were directly above game elements 20*a* will now fall downwards into the spaces created by the removal of game elements 20*b* and 20*c*. Thus, game element 20*e* will end up at the location 22*c*, and game element will end up at the location 22*b*. In addition, three new game elements are provided and fall downwards into the game board to fill the remaining three spaces above location 22*b*. The new game elements may be generated at random. The user then has a new game board on which to play a subsequent move.

Some embodiments may use so-called physics to control movement of game elements when replenishing a game board. For example, some embodiments may use the game physics used in Candy Crush Saga. In this game, game elements drop down from above the game board at set speeds and from the top of the game board. In an alternative version of this game detailed in U.S. Ser. No. 14/316,274 and launched under the name Candy Crush Soda, the physics can vary so that the speed and direction of replacement game elements can alter. It should be appreciated that the game physics described are by way of example and in other embodiments any suitable game physics may be used. In some embodiments, the replenishment of a game board may be controlled without the use of game physics.

In the following, a game board is made up of game positions or tiles each of which is covered by a respective game element or game object.

In some embodiments, one or more of the game elements is of a first type. This first type of game element covers two game positions or tiles. These game elements of the first type will be referred to first game elements in the following.

Figure 5:
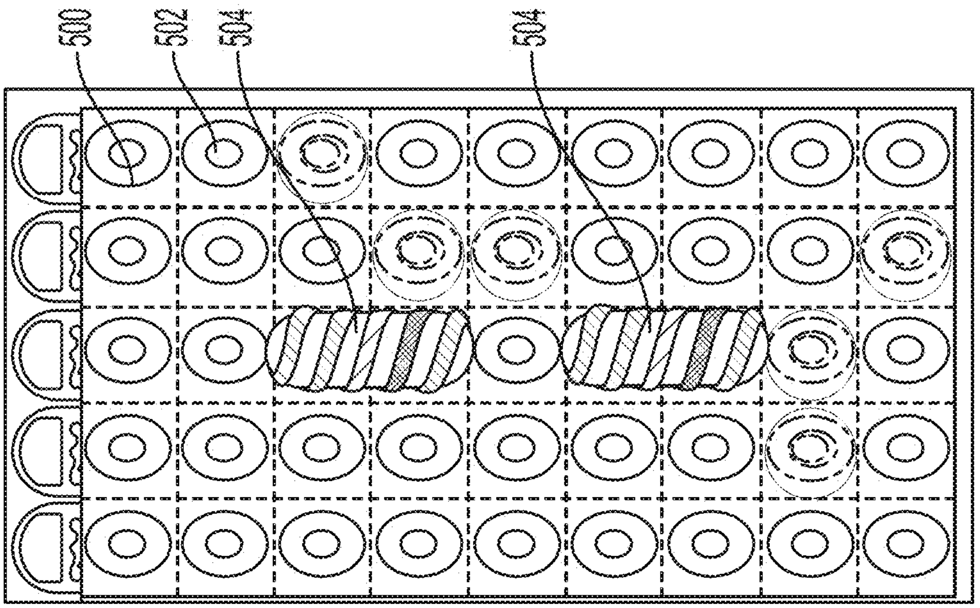
FIG. 5 schematically shows a game board with a first game element.

Reference is made to FIG. 5 which shows a game board 500 with game elements 502. On the game board 500 are two game elements of the first type 504. As can be seen, each game element of the first type occupies two tiles of the game board. This contrasts with the other game elements 502 which each occupy one tile of the game board. These game elements are of a second type and are referred to as second game elements in the following.

In the example shown in FIG. 5, each of the first game elements is arranged covering two tiles which are in the same column and two different, adjacent rows. A first game element may alternatively or additionally be arranged covering two tiles which are in the same row and two different columns.

In some embodiments, a first game element of the first type may occupy more than two tiles.

In some embodiments, the first game element may be a so-called blocker or static. This means that the position of the first game element with respect to the game board is unchanged even if, for example a removable second game element 502 located below (if the direction of replenishment is from above) that blocker is removed. The second game elements will move in the game board if for example a game element below it (if the direction of replenishment is from above) is removed. It should be appreciated that one or more additional or alternative directions of replenishment may be used in different embodiments which will influence the movement of second game elements when game elements are removed from the game board.

In some embodiments, the first game element may not be static but may be able to move on the game board.

Figure 6:
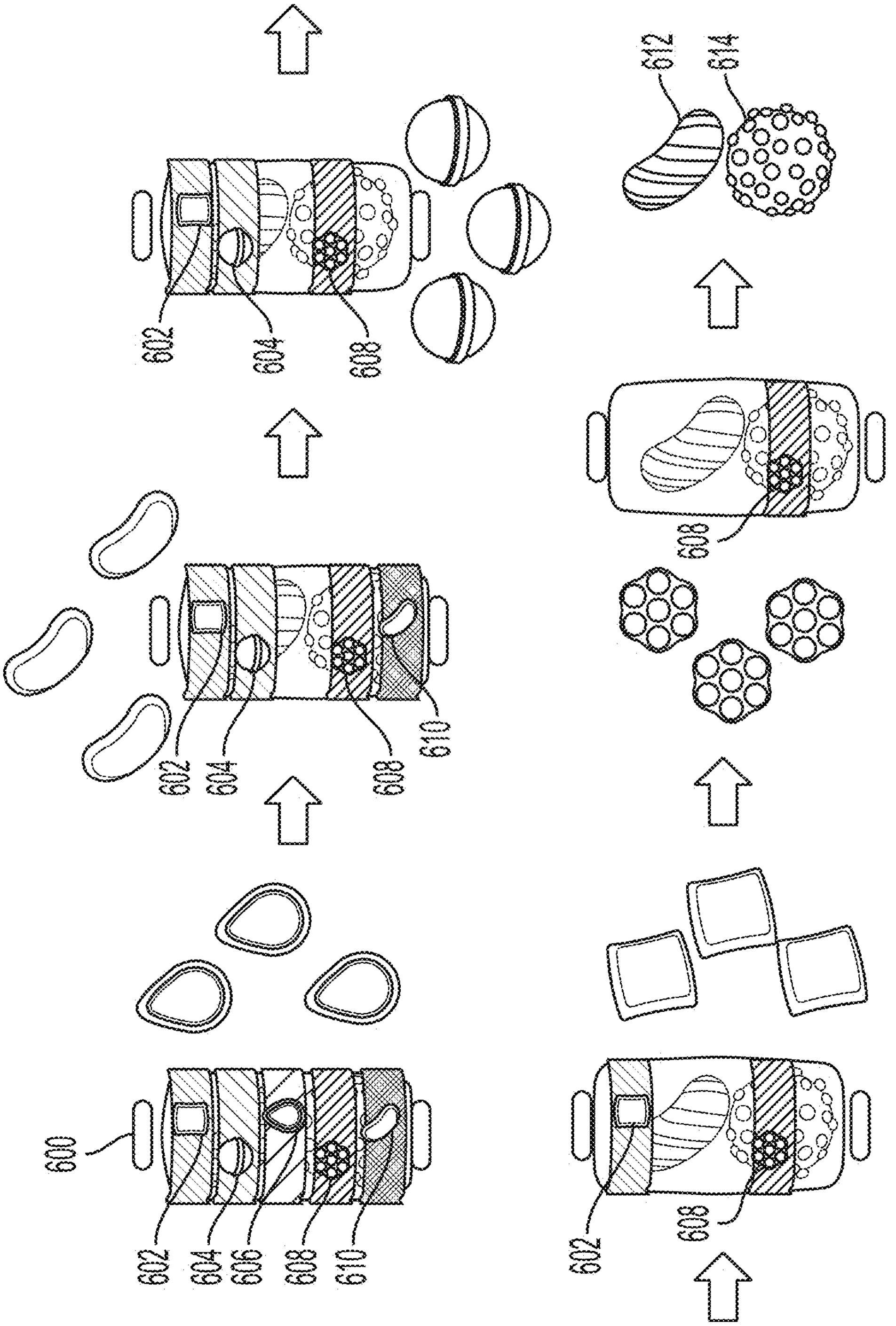
FIG. 6 schematically shows the removal of different layers of the first game element.

Reference is made to FIG. 6 which shows in more detail the first game element 600. The first game element is associated with five different match characteristics. In the following example the match characteristic is colour. The first game element has five different layers, each layer associated with five different colours 602, 604, 606, 608 and 610. FIG. 6 shows the first game element as the different layers are removed. When each of these layers are removed, two game boosters will be provided or revealed on the game board at the location of the first game element. Each of these game boosters occupies one tile, in some embodiments.

A booster game object is one which provides an effect on the game board when triggered. For example, a booster game object may remove a row or column of game elements, remove one or more blocking game elements, remove one or more game elements, and change one or more game elements from one type of game element to another type of game element. It should be appreciated that these are some examples of booster game objects. Alternative or additional examples of booster game objects may be used in some embodiments.

In some embodiments, the two booster game objects which are provided by the first game element may be triggered at the same time together to provide an effect which generally is greater than the effect provided by the two booster game objects individually. The booster game objects may be triggered together in some embodiments by moving one booster game object to the position of the other booster game object. In some embodiments, the boosters may be triggered automatically when revealed.

In some embodiments, the two booster objects, provided by the first game element, may be the same. In other embodiments, the two booster objects, provided by the first game element, may be different.

In some embodiments, the booster objects which are provided by the first game element are at least partially and, in some embodiments, fully hidden from the player when all the layers of the first game element are present. As the layers of the first game element are removed, the game boosters are revealed. In some embodiments, the game boosters may only be revealed or visible to the player after all the layers for the first game element are removed.

In some embodiments, one or more of the boosters provided may be associated with one or more of the matching characteristics of the layers of the first game element.

In the example shown in FIG. 6, five different layers are provided. In some embodiments, more or less than five different layers may be provided. By way of example four or six different layers may be provided. Other numbers of layers may be provided in other embodiments.

In the example shown in FIG. 6, each of the different layers is associated with a different matching characteristic which in this example is colour. In some embodiments, two or more of the different layers may be associated with the same matching characteristic such as colour.

In order to remove a layer of a particular colour of the first game element, a match needs to be made adjacent the first game element. The match should include a game element which is next to the first game element in a same row or column as the first game element. Any match satisfying this criteria will cause a layer of the first game element to be removed. The match will need, in the example of FIG. 5 to make a match which includes at least:

- the game element directly above or below the first game element in the same column as the game element; or
- one or more game elements in one or more of the same rows of the first game element and which are directly adjacent the first game element.

This match should comprise second game elements of the same colour as the layer to be removed. For example, as shown initially in FIG. 6, the middle layer 606 of the first game element is removed. The middle layer may be associated with the colour yellow. Three or more yellow second game elements may satisfy a match criteria by being arranged in a line, a row or in a particular pattern. When those three or more second game elements satisfy a match criteria and one or more of those second game elements is adjacent the first game element, then the layer associated with the respective colour is removed from the first game elements.

Thus in some embodiments, a second game element of a match is considered adjacent the first game element when is in the same row as the first game element and directly next to the first game element or when is in the same column as the first game element and directly next to the first game element. In other embodiments, alternatively or additionally diagonally adjacent second game elements in a match may be considered to be adjacent the first game element and as such to cause the removal of a layer of the first game element. In other embodiments, a different criteria relating to the location of the second game elements to trigger the removal of a layer of the first game element may be used.

As can be seen from FIG. 6, where the middle layer is removed, the underlying boosters start to be revealed. In some embodiments, the underlying boosters may be provided under a semi-opaque layer or translucent layer, such as shown in FIG. 6.

Next, as shown in FIG. 6, the fifth layer 610 of the first game element is removed. The fifth layer may be associated with the colour red. When three or more second red game elements satisfy a match criteria and one or more of those second red game elements is adjacent the first game element, then the fifth layer is removed from the first game element.

Next, as shown in FIG. 6, the second layer 604 of the first game element is removed. The second layer may be associated with the colour blue. When three or more second blue game elements satisfy a match criteria and one or more of those second blue game elements is adjacent the first game element, then the second layer is removed from the first game element.

Next, as shown in FIG. 6, the first layer 602 of the first game element is removed. The first layer may be associated with the colour green. When three or more second green game elements satisfy a match criteria and one or more of those second green game elements is adjacent the first game element, then the first layer is removed from the first game element.

Finally, as shown in FIG. 6, the fourth layer 608 of the first game element is removed. The fourth layer may be associated with the colour purple. When three or more second purple game elements satisfy a match criteria and one or more of those second purple game elements is adjacent the first game element, then the fourth layer is removed from the first game element.

In some embodiments, the layers may be removed from the first game element in any order. In other embodiments, the player may be required to the remove the layers in a particular order. For example, in the example of FIG. 6, the player may be required to remove the layers is the order of first to fifth layers. Thus, when all the layers are present, only a match involving green game elements adjacent the first game element would cause a layer to be removed. Thus a match involving blue game elements adjacent the first game element would not cause a layer to be removed unless the next layer to be removed was associated with the blue colour.

In some embodiments, where the layers are to be removed in a particular order, information may be provided to the player as to which is the next layer is to be removed. For example, the next layer to be removed may be displayed in a visually distinct manner as compared to other of the layers. In some embodiments, the colour of the first game element may change depending on which layer is the next one to be removed. In some embodiments, a message may be displayed on the display indicating the next layer to be removed.

In some embodiments, triggering of a booster game object may cause a layer of the first game element to be removed if the effect of the booster game object extends to one or both of the positions of the first game element on the game board. In some embodiments, the layer which is removed when a booster game object is triggered may be selected at random or using any other suitable criteria.

In some embodiments, a layer will be removed from the first game element after the triggering of a booster game object, regardless of any colour associated with the booster game element. For example a booster game element may be associated with the colour green and when triggered this will cause the removal of a layer of the first game element if the first game element has no layer associated with the colour green.

In other embodiments, where the booster game object is associated with a colour, the layer of the first game element which is removed will be that associated with that same colour.

In some embodiments, as result of one move made by the player, two or more layers of the first game element may be removed in one turn. For example, the player may make a match adjacent the first game element which removes one layer of the first game element and the refilling of the game board results in the triggering of a booster game object which removes another layer of the first game element or even the making of another match adjacent the first game element.

Where the first game element has two or more layers associated with the same colour, a match involving that same colour will result in one of those layers being removed. The layer of the two or more layers associated with that colour which is removed may be selected at random or using any other suitable criteria.

As can be seen from FIG. 6, when all the layers are removed, the two booster game objects 612 and 614 are thus revealed. The player is only able to trigger these booster game objects once all the of the layers of the first game element are removed. Where the booster game objects are automatically triggered, all of the layers of the first game object need to be removed before the booster game objects are triggered.

In the examples discussed, reference has been made to each layer being associated with a particular colour. In other embodiments, the layers may be associated with different matching characteristics such as shape, wording, numbering, object, tag, visual effect and/or the like. In some embodiments, there may be two or more matching characteristics associated with a layer.

In some embodiments, each layer may be associated with a particular colour and shape. In some embodiments, there may be a one to one relationship between a particular colour and a particular shape. Thus a colour is associated with one particular shape.

In some embodiments, different layers may be associated with different types of characteristics. For example, one set of layers of first game elements may comprise red, green, square and triangle. In this illustrative example, some characteristics are of the colour type and others are of the shape type. Of course in other embodiments, the different types of matching characteristic may be any suitable type of matching characteristics.

It should be appreciated that a single set of characteristics may be used in the game with the first game element. In some embodiments a plurality of different sets of matching characteristics may be used in the game with the first game element. The number of characteristics in the different sets may be same or different. Different characteristics and/or different orders of characteristics and/or different types of characteristics may be provided in a set. The set or sets of characteristics which are used for the first game element may be dependent on a level of a game.

In some embodiments, whenever a match is made next to the first game element, the first game element may be animated or may teeter in its position. This may be regardless of whether the criteria to remove one of the layers is satisfied or not. If the criteria to remove a layer is satisfied, a sound effect may also be triggered.

Figure 7:
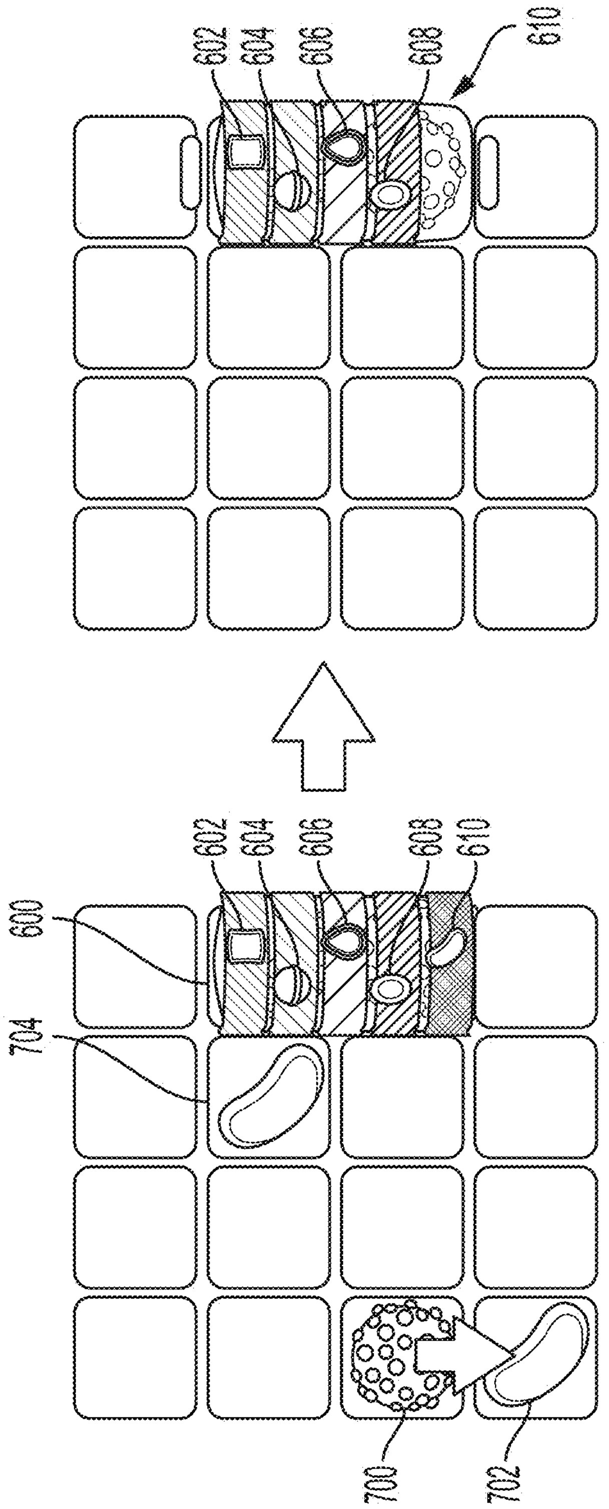
FIG. 7 schematically shows an interaction between one example of a game booster and the first game element.

Reference is made to FIG. 7 which shows a so-called colour bomb booster game object 700. The colour bomb booster game object is triggered by moving the colour bomb booster to the position of an adjacent second game element 702 which in this example is red. This will cause all the red second game elements to be removed from the game board. In this example, the first game element 600 described in relation to FIG. 6 is provided on the game board and a red game element 704 is located adjacent the first game element. The first game element 600 still has its red layer. Triggering of the colour bomb, as a result of game element 704 being adjacent the first game element, will cause the red layer of the first game element to be removed.

Figure 8:
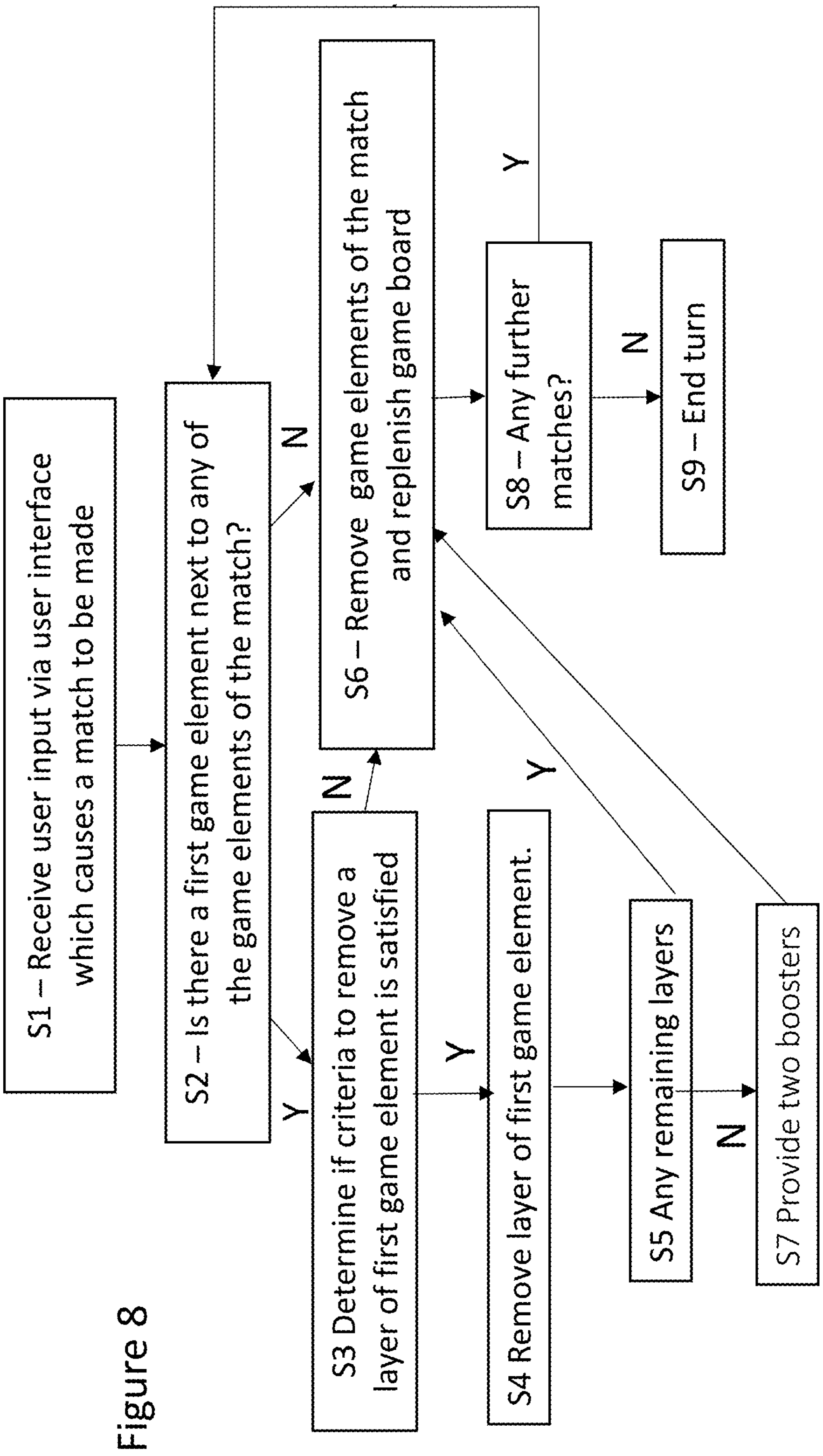
FIG. 8 schematically shows a flow chart showing steps performed by a user device.

Reference is made to FIG. 8 which shows a method according to an embodiment where a layer is removed from the first game element as a result of a match of second game elements being made adjacent the first game element. The method may be performed by at least one processor in conjunction with at least one memory of the user device.

In step S1, user input is received via the user interface to make a move. The at least one processor is configured to determine that a match has been made. This may be responsive to the user interacting with the game board via the user interface (for example a touch screen on which a game board of game elements is displayed). For example, the user may interact with the user interface to swap the position of two game elements to make a match. The at least one processor may be configured to determine if the move made by the user is a valid move. In some embodiments, a valid move is made where a match is made. In some embodiments, the at least one processor is configured to determine that that three or more second game elements having one or more common matching characteristics satisfy one or more match criteria. For example, three or more second game elements having one or more common matching characteristics may be arranged in a line.

In step S2, the at least one processor is configured to determine if one or more of the second game elements satisfying the match characteristic are adjacent a first game element. If not the next step is step S6 which will be discussed in more detail later. If so, the next step is step S3.

In step S3, the at least one processor is configured to determine if one or more criteria required to remove a layer of the first game element is satisfied. For example the criteria may be that one or more matching characteristics of the second game elements are the same as one or more matching characteristics associated with one or more of the layers to be removed or the next layer which is to be removed. If not the next step is step S6. If so, the next step is step S4.

In step S4, the at least one processor is configured to cause the respective layer associated with the satisfied criteria to be removed.

In step S5, the at least one processor is configured to determine if the first game element has any remaining layers. If so, the next step is step S6. If not, the next step is step S7.

In step S7, the at least one processor is configured to reveal or provide the two booster game objects at the position of the first game element on the game board.

Step S6 follows step S7 and steps S2, S3 and S5 in the conditions discussed previously. The at least one processor is configured to remove the second game elements of the match from the game board and cause the game board to be replenished. In some embodiments, step S6 take place before, after or at the same time as one or more of steps S3, S4, S5 and S7.

In some embodiments, where the boosters are revealed as a result of a match, the game board is replenished and stable before the boosters can be triggered. In some embodiments, the boosters are not triggered by the replenishment. When the game board is stable, the boosters will be on the game board when the game board is ready for the player to make the next move. In this way, the player may have the opportunity to trigger the boosters in a subsequent move. The boosters may in a subsequent move be triggered as a result of a replenishment of the game board in that subsequent move.

Step S6 is followed by step S8 in which the at least one processor is configured to determine if there are any further matches.

If there are, then the next step is step S2. If not, the next step is step S9 where the at least one processor is configured to determine that the turn is ended.

A sound effect may be used to indicate a removal of a layer of the first game element.

In some embodiments, the first game element is visualised such that each layer is represented as a stripe across the first game element. The aim may be remove all the layers. The layers are provided side by side in this example.

Figure 9:
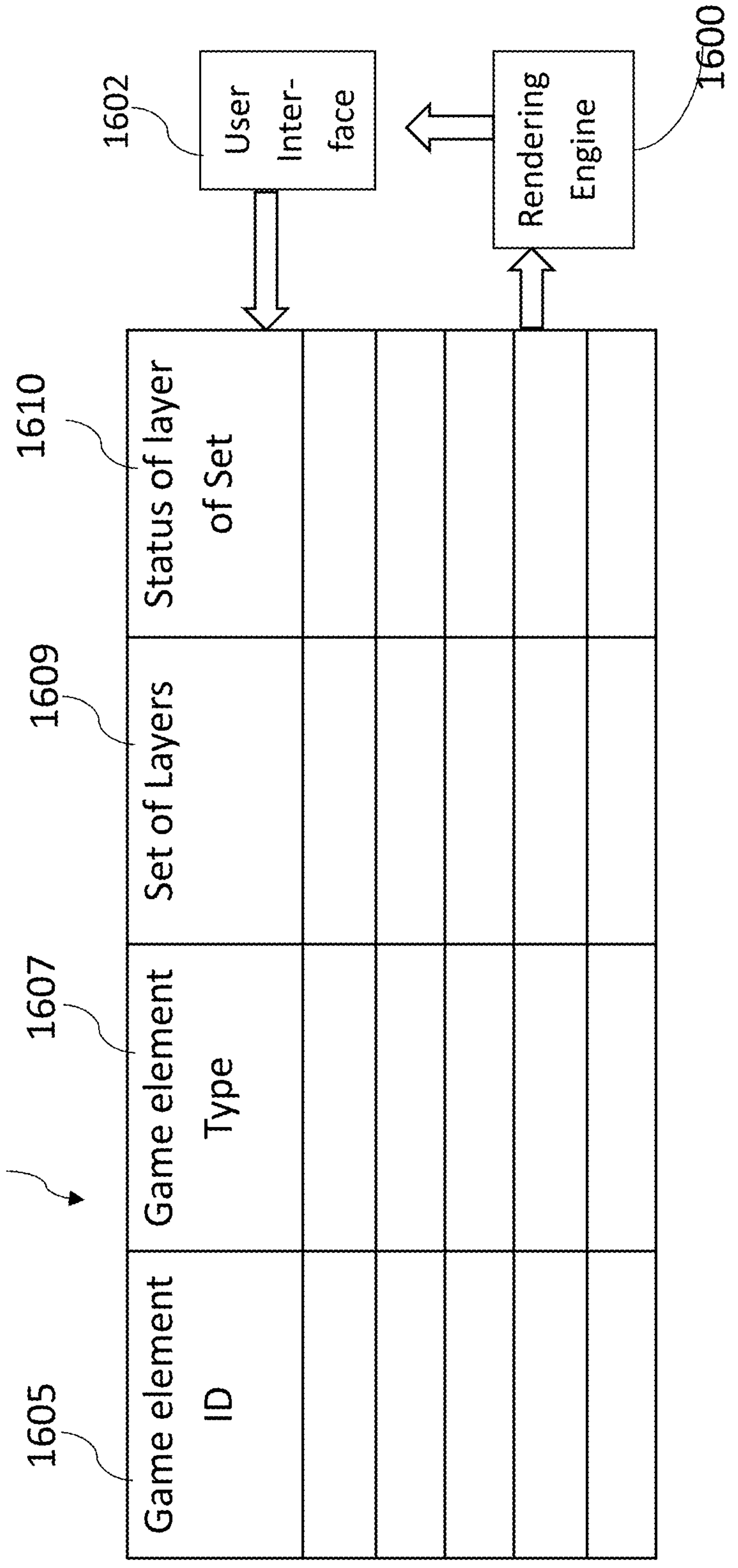
FIG. 9 schematically shows a data structure for managing game element data, showing the interrelation between the data structure and a rendering engine of a graphics controller.

FIG. 9 illustrates a data structure for managing the appearance of the first game element, and schematically illustrates the interrelation between the data structure 1603 and a rendering engine 1600 of the graphics controller 125. The graphics controller is in the user device as described previously. The data structure 1603 can be held in any suitable storage circuitry, such as in the memory of the user device, as described previously. The rendering engine 1600 drives the display on a user interface 1602 which receives the video output from the graphics controller.

The data structure 1603 is responsible for controlling the game board displayed. Each game element has a game element ID 1605. The game element ID 1605 is used by the game engine. The game element ID may be allocated a particular position on a game board. In the case of the first game elements, this position is over two tiles of the game board. The data structure may have information 1607 identifying the game element type 1607 (for example if the game element is a first game element, a second game element or a game booster game object). If the game element is a first game element, the game element may have a set of layers information 1609. This layer information will indicate the number of layers and the matching characteristic associated with each layer. The status of the layer of the set field 1610 will indicate if the layer has been removed or is still present. Where the layers need to be removed in a particular order, this may be indicated by a flag which is either set or not set. The order in which the layers are to be removed may be provided as part of the set of layers field.

After a move has been made or after there has been some change to the game board, the game engine will update this data. The status of a layer of the set may be updated when that layer is removed. The first game element will be rendered by the rendering engine and displayed with the updated appearance to show the removal of a layer.

In some of the previously described embodiments, the first game element has been described as being a blocker. In other embodiments, the first game element may not be a blocker and thus may move in the same way as outlined in relation to the second type of game elements.

Figure 10:
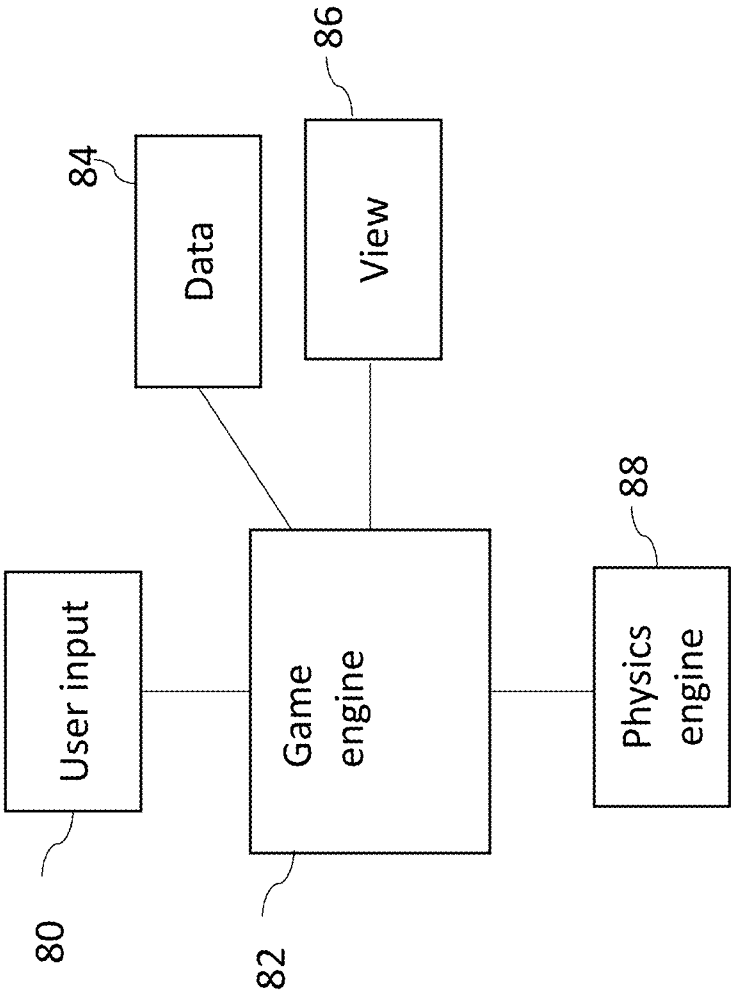
FIG. 10 is a schematic diagram showing the modules and functions associated with carrying out the operating of embodiments.

Reference is made to FIG. 10 which schematically shows the functional blocks of an embodiment, which may enable game play such as discussed previously. This may be proved in the computer device of FIG. 4. A user input block 80 is shown. This captures the user input received via the user interface and feeds the input to a game engine 82. In the context of the game of some embodiments, this user input may be which game elements are switched by a user. This user input can be via any suitable user interface, such as discussed earlier. One or more of the functional blocks of FIG. 10 may be performed by at least one processor. The game engine may be provided by at least one processor.

The game engine 82 will process the information provided by the user input. The game engine 82 (for example a game model) will determine if a valid combination has been made.

Each game element has data associated therewith. The data 84 may be stored in any suitable memory location. In some embodiments, the data may be provided by the data structure described previously. In some embodiments, the data may be considered to be part of the game engine and in other embodiments may be considered to be outside the game engine. The data may provide information as to the properties of the game element such as described previously. The data may include the position data, that is, information representing the position of the game element in the displayed image.

In some embodiments, the game engine will check if a move made by the user causes the game elements to satisfy the rule or rules for a valid match. The rule or rules which define whether or not a match condition has been satisfied will be dependent on the game. In some embodiments, a match condition will be satisfied if the game elements are arranged to provide a sequence or pattern of at least three adjacent first objects sharing at least one same characteristic.

Thus, the game engine will be in control of the matching mechanism. The game engine will have access to data for a game element including its position and will be able to determine if a match condition has been met.

It should be appreciated that in other embodiments, the game may use any type of match mechanic such as switching, sliding or linking. The game elements may be any suitable game element.

A physics engine 808 is provided which is configured to control the movement of moving game elements on the display. The tiles are static is some embodiments. For example, the physics engine may control the movement of the game elements when the game board is replenished.

The physics engine 808 may be part of the game engine 802.

A view function 806 uses of the data to provide the displayed image with which the user is able to view and/or interact.

Various methods and devices have been described. It should be appreciated that these methods may be implemented in apparatus or devices comprising any suitable circuitry. Some embodiments may be implemented by at least one memory and at least one processor. The memory is provided by memory circuitry and the processor is provided by processor circuitry. Some embodiments may be provided by a computer program running on the at least one processor. The computer program may comprise computer implemented instructions which are stored in the at least one memory and which may be run on the at least one processor. A computer program product may be provided which comprises computer program product comprising code embodied on a computer-readable medium which is configured to be executed on a processor of the computer or user device. In some embodiments, a non-transitory computer readable storage device may be provided to store program code instructions that, when executed by at least one processor causes any of the above described methods to be performed.

A person skilled in the art will realise that the different approaches to implementing the game is not exhaustive, what is described herein are certain preferred embodiments. It is possible to implement the way in a number of variations without departing from the scope of the invention as claimed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer device configured to provide a computer implemented game, the computer device comprising:

a display configured to display game elements in a game board of a computer implemented game, the game board comprising a plurality of tiles, the game elements comprising one or more game elements of a first type which each occupy two or more tiles of the game board and game elements of a second type which each occupy one tile of the game board, the game elements of the first type having a semi-opaque layer over which a plurality of layers are provided, each layer of the plurality of layers being associated with a respective matching characteristic with two or more of the plurality of layers being associated with a different respective matching characteristic, each layer being visualised as a respective stripe having the respective matching characteristic, two or more game objects underly the semi-opaque layer of a first game element of the first type;

a user interface configured to detect user input when a user engages with a game element in a move; and at least one processor configured to determine that the move has resulted in one or more match conditions being satisfied by one or more first game elements of the second type having a first matching characteristic and one or more of first game elements of the second type are adjacent a first game element of the first type, in response to determining that the one or more of the first game elements of the second type is adjacent the first game element of the first type, determine that the first game element of the first type has a first layer associated with the first matching characteristic, and in response to determining that the first game element of the first type has the first layer associated with the first matching characteristic, cause first layer to be removed from the first game element of the first type, wherein when all of the plurality of layers of the first game element of the first type are removed, the two or more game objects on the two or more tiles previously occupied by the first game element of the first type become available.

2. The computer device as claimed in claim 1, wherein each of the plurality of layers of the game element of the first type are associated with different matching characteristic.

3. The computer device as claimed in claim 1, wherein at least two of the plurality of layers of the game element of the first type are associated with a same matching characteristic.

4. The computer device as claimed in claim 1, wherein as one or more of the plurality of layers of a respective game element of the first type are removed, at least a part of one or more of the two or more game objects underlying the semi-opaque layer of the first type of game element are displayed on the display under the semi-opaque layer.

5. The computer device according to claim 1, wherein one or more of the two or more game objects comprise a booster game object.

6. The computer device as claimed in claim 5, wherein the at least one processor is configured, when all of the plurality of layers of the first game element of the first type have been removed, to ensure that one or more of the two or more game objects which comprise the booster game object are available for the user to select in a next move of the user.

7. The computer device as claimed in claim 1, wherein the game elements further comprise one or more booster game objects, the at least one processor being configured to determine that one or more booster game objects has been triggered to interact with a game element of the first type and in response to cause one or more of the plurality of layers of that game element of the first type to be removed.

8. The computer device as claimed in claim 7, wherein interaction of the one or more booster game objects with the game element of the first type comprises providing an effect at one or more of the tiles occupied by that game element of the first type.

9. The computer device as claimed in claim 7, wherein interaction of the one or more booster game objects with the game element of the first type comprises providing an effect on a game element of the second type at a location adjacent to the game element of the first type.

10. The computer device as claimed in claim 7, wherein interaction of the one or more booster game objects with the game element of the first type comprises providing an effect on a game element of the second type at a location adjacent to the game element of the first type, said game element of the second type at the location adjacent to the game element of the first type having a matching characteristic which is the same as that of the layer of the game element of the first type which is removed.

11. The computer device according to claim 1, wherein the matching characteristic comprises at least one of a colour characteristic; a shape characteristic; or an object characteristic.

12. A computer implemented method provided by a computer device configured to provide a computer implemented game, the method comprising:

displaying, by a display of the computer device, game elements in a game board of a computer implemented game, the game board comprising a plurality of tiles, the game elements comprising a first type of game element which each occupy two or more tiles of the game board and a second type of game element which each occupy one tile of the game board, the game element of the first type having a semi-opaque layer over which a plurality of layers are provided, each layer of the plurality of layers being associated with a respective matching characteristic with two or more of the plurality of layers being associated with a different respective matching characteristic, each layer being visualised as a stripe having the respective matching characteristic, two or more game objects underly the semi-opaque layer of the game element of the first type;

detecting, by a user interface of the computer device, user input when a user engages with a game element in a move;

determining, by at least one processor of the computer device, the move has resulted in one or match conditions being satisfied by one or more first game elements of the second type having a first matching characteristic and one or more of the first game elements of the second type is adjacent a first game element of the first type, in response to determining that the one or more of the first game elements of the second type is adjacent the first game element of the first type, determining, by the at least one processor, that the first game element of the first type has a first layer associated with the first matching characteristic; and in response to determining that the first game element of the first type has the first layer associated with the first matching characteristic, causing by the at least one processor, the first layer to be removed from the first game element of the first type, wherein when all of the plurality of layers of the first game element of the first type are removed, the two or more game objects on the two or more tiles occupied by the first game element of the first type become available.

13. The computer implemented method as claimed in claim 12, wherein each of the layers of the game element of the first type are associated with different matching characteristics.

14. The computer implemented method as claimed in claim 12, wherein at least two of the layers of the game element of the first type are associated with a same matching characteristic.

15. The computer implemented method as claimed in claim 12, wherein one or more of the two or more game objects comprise a booster game object.

16. A non-transitory computer readable storage medium comprising computer executable instructions that, when executed by at least one processor of a computer device cause the computer device to:

display, by a display of the computer device, game elements in a game board of a computer implemented game, the game board comprising a plurality of tiles, the game elements comprising a first type of game element which each occupy two or more tiles of the game board and a second type of game element which each occupy one tile of the game board, the game element of the first type having a semi-opaque layer over which a plurality of layers are provided, each layer of the plurality of layers being associated with a respective matching characteristic with two or more of the plurality of layers being associated with a different respective matching characteristic, each layer being visualised as a stripe having the respective matching characteristic, two or more game objects underly the semi-opaque layer of the game element of the first type;

detect, by a user interface of the computer device, user input when a user engages with a game element in a move; and determine, by at least one processor of the computer device, that the move has resulted in one or match conditions being satisfied by one or more first game elements of the second type having a first matching characteristic and one or more of the first game elements of the second type is adjacent a first game element of the first type, in response to determining that the one or more of the first game elements of the second type is adjacent the first game element of the first type, determining, by the at least one processor, that the first game element of the first type has a first layer associated with the first matching characteristic, in response to determining that the first game element of the first type has the first layer associated with the first matching characteristic, causing by the at least one processor, the first layer to be removed from the first game element of the first type, and wherein when all of the plurality of layers of the first game element of the first type are removed, the two or more game objects on the two or more tiles occupied by the first game element of the first type become available.

* * * * *